Figure 1:
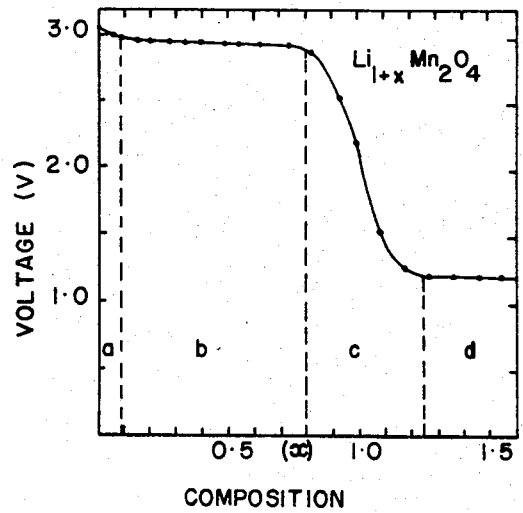

United States Patent [19]

Thackeray et al.

[11] Patent Number: 4,507,371
[45] Date of Patent: Mar. 26, 1985

[54] SOLID STATE CELL WHEREIN AN ANODE, SOLID ELECTROLYTE AND CATHODE EACH COMPRISE A CUBIC-CLOSE-PACKED FRAMEWORK STRUCTURE

[75] Inventors: Michael M. Thackeray, Pretoria, South Africa; John B. Goodenough, Oxford, England

[73] Assignee: South African Inventions Development Corporation, South Africa

[21] Appl. No.: 498,859

[22] Filed: May 27, 1983

[30] Foreign Application Priority Data

Jun. 2, 1982 [ZA] South Africa ............... 82/3871

[51] Int. Cl.$^3$ ............................................. H01M 6/18
[52] U.S. Cl. ............................... 429/191; 429/193; 429/218; 429/224
[58] Field of Search .............. 429/191, 193, 218, 221, 429/224

[56] References Cited

U.S. PATENT DOCUMENTS

| | | | |
|---|---|---|---|
| 4,136,233 | 1/1979 | Eisenberg | 429/112 |
| 4,176,170 | 11/1979 | Kasper et al. | 429/191 |
| 4,246,253 | 1/1981 | Hunter | 429/224 X |
| 4,366,215 | 12/1982 | Coetzer et al. | 429/224 |

OTHER PUBLICATIONS

"Preliminary Investigation of the Electrochemical Performance of Alpha-Fe$_2$O$_3$ and Fe$_3$O$_4$ Cathodes in High Temperature Cells", Coetzer, et al., *Materials Research Bulletin*, vol. 16, pp. 591-596, (1981).

"Transition Metal Sulfide-Lithium Organic Electrolyte Rechargeable Cells"-Eisenberg-Proceedings of the 28th Power Sources Symposium, pp. 155-157, (1978).

"Electrode Reactions and Iron Oxide Selections for the Thermal Cell Mg/LiCl-KCl/FeO$_x$Ni", Selis, et al., *Journal of the Electrochemical Society*, Jun. 1963, pp. 469-476.

Japanese published patent specifications 78/104085, 78/120629, 78/125326, Sanyo Electric Company.

"Evaluation of Lithium Titanates as Cathode Materials", Liebert, PhD., Thesis, Stanford University, 1977, Abstract & pp. 95, 100 and 117-119.

"Preparation of New Crytal Form of Manganese Dioxide: Lamda-MnO$_2$", Hunter, *Journal of Solid State Chemistry* 39, pp. 142-147, (1981).

*Primary Examiner*—Anthony Skapars
*Attorney, Agent, or Firm*—Arnold, White & Durkee

[57] ABSTRACT

The invention provides an electrochemical cell wherein an anode, solid electrolyte and cathode each comprise a cubic-close-packed framework structure having, as its basic structural unit, a unit of the formula $(B_2)X_4{}^{n-}$ which is the structural unit of an $A(B_2)X_4$ spinel. The structure accommodates active cations $M^+$ capable of diffusion therethrough. The invention also extends to electrodes and electrolytes of the above type for use in such cells.

23 Claims, 1 Drawing Figure

SOLID STATE CELL WHEREIN AN ANODE, SOLID ELECTROLYTE AND CATHODE EACH COMPRISE A CUBIC-CLOSE-PACKED FRAMEWORK STRUCTURE

This invention relates to electrochemical cells and to components (anodes, cathodes and electrolytes) of such cells. In particular it relates to a solid state electrochemical cell and to solid state components for electrochemical cells.

According to the invention there is provided an electrochemical cell which comprises an anode and a cathode coupled together by a solid electrolyte, the anode and cathode being electronically conducting and the electrolyte being electronically insulating and each of said anode, cathode and electrolyte comprising a cubic-close-packed host framework structure having, as its basic structural unit, a unit of the formula $(B_2)X_4{}^{n-}$, where $(B_2)X_4{}^{n-}$ is the structural unit of an $A(B_2)X_4$ spinel, said host framework structure accommodating, within its interconnected interstitial spaces, electrochemically active cations M capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure, the B cations of the anode being more electropositive than those of the cathode.

In each of the framework structures of the anode, cathode and electrolyte, the B cations may be those of one or more transition metals. Furthermore, in each of these structures the various $(B_2)X_4{}^{n-}$ units may not only have B cations of the same or different metals, but the various B cations may be of the same or different valences. In general, H, and particularly Li, will be preferred for the M cation.

Spinel compounds have structures that can be represented by the general formula $A(B_2)X_4$ in which the X atoms are arranged in a cubic-close-packed fashion to form a negatively charged anion array comprised of face-sharing and edge-sharing X tetrahedra and octahedra. In the formula $A(B_2)X_4$, the A atoms are tetrahedral-site cations and the B atoms are octahedral-site cations, ie the A cations and B cations occupy tetrahedral and octahedral sites respectively. In the ideal spinel structure, with the origin of the unit cell at the centre (3m), the close-packed anions are located at the 32e positions of the space group Fd3m. Each unit cell contains 64 tetrahedral interstices situated at three crystallographically non-equivalent postions 8a, 8b and 48f, and 32 octahedral interstices situated at the crystallographically non-equivalent positions 16c and 16d. In an $A(B_2)X_4$ spinel the A cations reside in the 8a tetrahedral interstices and the B cations in the 16d octahedral interstices. There are thus 56 empty tetrahedral and 16 empty octahedral sites per cubic unit cell.

According to the present invention, therefore, the B cations of the $(B_2)X_4{}^{n-}$ host framework structure may be regarded as being located at the 16d octahedral positions, and the X anions located at the 32e positions of the spinel structure. The tetrahedra defined by the 8a, 8b and 48f positions and octahedra defined by the 16c positions of the spinel structure thus form the interstitial space of the $(B_2)X_4{}^{n-}$ framework structure for the mobile M cations.

The B cations of the framework structure may consist of one cationic type, or more than one cationic type of identical or mixed valence to provide various $(B_2)X_4{}^{N-}$ framework structures, the overall charge of which may vary over a wide range. Examples of such framework structures with group VIa anions are:

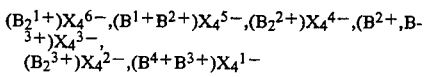

and there are more complex types.

Spinel compounds having the $(B_2)X_4$ framework structure may also be characterized by crystallographic space groups other than cubic Fd3m. For example, in $Mn_3O_4$ the $Mn^{2+}(Mn^{3+})O_4$ spinel structure is distorted as a result of the Jahn-Teller $Mn^{3+}$ octahedral site ions to tetragonal symmetry, and the compound is characterized by the tetragonal space groups $F4_1/ddm$ or $I4_1/amd$ in which the tetrahedral and octahedral site nomenclature differs from that as defined by the cubic space group Fd3m.

Furthermore, the electrodes and electrolytes of the present invention need not necessarily be stoichiometric compounds. For example, electrodes and electrolytes may be synthesized in which defects are created by varying the quantity of B cations in the framework structure such that additional M cations may enter the framework. In certain instances these additional M cations may partially occupy the 16d octahedral sites normally occupied by the B-type cations. Under such circumstances these partially occupied octahedra may be considered to form part of the interstitial space. Conversely, electrodes and solid electrolytes may also be synthesized, in which part of the interstitial spaced defined by the 8a, 8b and 48f tetrahedral and 16c octahedral interstices of the spinel structure may be occupied by B-type cations, thereby rendering these particular sites at least partially inaccessible to the mobile M cations. The $(B_2)X_4{}^{n-}$ framework structure may in certain instances have to be stabilized by the introduction of a minor proportion of cations other than the mobile M-type cations or B-type cations within the interstitial space of the framework structure.

In a preferred embodiment of the invention these stabilizing cations are selected from the group IIa or group IIb elements e.g. Mg, Zn or Cd.

The electrodes and solid electrolytes of this invention will generally not exist in nature, but may be prepared synthetically by one or more laboratory techniques such as:

(i) solid-state reaction of the appropriate elements or compounds in powdered or compacted form at elevated temperatures;

(ii) ion-exchange methods, for example using molten salts containing the required mobile M cation:

(iii) chemical or electrochemical titration methods. For example, controlled amounts of lithium can be introduced into a host framework structure either chemically using n-butyl-lithium or electrochemically. During the insertion process reduction of a B-type cation occurs.

In a particular case, it has been shown that when $MnO_2$ with a $BX_2$ rutile-type structure is reacted with n-butyl-lithium at 50° C., lithium enters the rutile structure; and at a certain lithium concentration $x_c$ a transformation of the rutile structure to a spinel-type structure occurs resulting in a compound with the required $(B_2)X_4$ framework. Such a reaction can be written as $$x_cLi + 2MnO_2 \rightarrow Li_{x_c}Mn_2O_4$$

In the compound $Li_{x_c}Mn_2O_4$ formed by the above reaction, the Mn cations occupy the B positions of the $A(B_2)X_4$ spinel and the Li cations occupy the tetrahedral and octahedral positions of the interstitial space. This transformation process may be extended to other compounds having other $BX_2$ structures such as ramsdellite $MnO_2$.

The principles of this invention may be illustrated using $LiMn_2O_4$ as a typical spinel compound having the required $(B_2)X_4$ framework structure. Particular reference is made to the retention of the $(B_2)X_4$ framework structure during lithiation of this compound and to the mobility of the Li cations within the interstitial space.

A cell having a lithium anode, a cathode containing about 15 mg of $LiMn_2O_4$ compacted onto a stainless steel gauze disc and an electrolyte consisting of 1 molar $LiBF_4$ in propylene carbonate was constructed and was discharged at a current rate of 20 micro-A/cm² at room temperature (about 20° C.).

Electrochemical insertion of lithium into $LiMn_2O_4$ produced an open-circuit voltage vs. composition plot for $Li_{1+x}Mn_2O_4$ as illustrated in FIG. 1. The discharge curve is characterised by four distinct regions a, b, c and d. X-ray diffraction analysis of $Li_{1+x}Mn_2O_4$ samples with various Li ion concentrations (ie different x values) indicated that the reaction process occurs by the following mechanisms:

(a) Insertion of lithium into a cubic $Li_{1+x}Mn_2O_4$ phase for $0 < x \leq 0.1$.

(b) For $0.1 \leq x \leq 0.8$ a two-phase region exists consisting of a cubic $Li_{1+x}Mn_2O_4$ and a tetragonal $Li_{1+x}Mn_2O_4$ phase. During this stage, lithium is continuously inserted into the $(Mn_2)O_4$ framework structure, but with the tetragonal phase growing at the expense of the cubic phase.

(c) Insertion of lithium into a tetragonal phase, $Li_{1+x}Mn_2O_4$ phase for $0.8 \leq x \leq 1.25$.

(d) Reaction with lithium in the range $x \leq 1.25$ appears to destroy the spinel-type structure leaving unidentified products.

The existence of the two-phase region between $0.1 \leq x \leq 0.8$ is due to a co-operative Jahn-Teller distortion that arises as a result of an increased concentration of $Mn^{3+}$ ions being generated during discharge on the octahedral sites of the spinel framework structure. This observation has an important implication for cell applications. If insertion of lithium into compounds increases the concentration of a Jahn-Teller ion, such as $Mn^{3+}$, and introduces a first order co-operative Jahn-Teller distortion, a two-phase electrode results, yielding a flat voltage plateau during discharge over a wide compositional range.

Although lithiation of $LiMn_2O_4$ produced a two-phase electrode for $0.1 \leq x \leq 0.8$, it was evident from X-ray diffraction analysis of various samples that the $(Mn_2)O_4$ (or $(B_2)X_4$) framework of the spinel structure remained intact during the whole lithiation process, as represented by regions a, b and c of FIG. 1, and that Li ion diffusion at room temperature was restricted to the interstitial space of the tetrahedral ($8a$ and possibly $48f$) and octahedral ($16c$) sites of the $(B_2)X_4$ framework as defined by the cubic spinel space group Fd3m.

Furthermore, it has been shown that lithium may be chemically removed from $LiMn_2O_4$ by reaction with aqueous acid, to yield a compound $Li_{1-x}Mn_2O_4$, in which the $(Mn_2)O_4$ framework of the spinel structure is maintained. It is possible that lithium may therefore also be removed electrochemically from $LiMn_2O_4$ thereby significantly increasing the compositional range of this solid electrode.

From the above example in which $LiMn_2O_4$ is used as cathode material, it is clear that the principles involved will also extend to anode materials and solid electrolytes in accordance with the invention and of the same structural type.

The B cations of the $(B_2)X_4{}^{n-}$ framework structure may be suitably selected depending on whether the compound is to function as an electrode or a solid electrolyte.

For example, where the $(B_2)X_4{}^{n-}$ framework structure is to be used to host mobile, electrochemically active M cations for use as a solid electrolyte, the B cations must be selected such that the framework, and hence the solid electrolyte, is electronically insulating to prevent internal short-circuiting of the cell.

In a preferred embodiment of the invention, the mobile M cations of the solid electrolyte may consist of H, Li, Cu or Ag ions, preferably H and particularly Li ions.

Furthermore, for a solid electrolyte in accordance with the invention, the B cations, instead of being transition metals, may be metals such as Al and/or Ga.

The electrodes with $(B_2)X_4{}^{n-}$ framework structures of the present invention must be electronic conductors. In instances where the $(B_2)X_4{}^{n-}$ framework structures themselves are poor electronic conductors or are electronic insulators at particular loadings of M cations, electrochemically inert conductive additives such as carbon (graphite) or metal powders may be used to improved the electronic conductivity of the electrodes; and, if necessary, the electrodes may be used together with conducting metal support structures, for example of nickel or stainless steel. The electrodes may be in compacted form and strengthened, if necessary, with a binding agent such as polytetrafluoroethylene (PTFE), or the electrodes may be in powdered form and housed in porous containers such as graphite cups which are conveniently less than 70% dense, ie which have a density less than 70% of that of graphite.

The invention extends also to anodes and solid electrolytes having the $(B_2)X_4{}^{n-}$ framework structure described above, and to cathodes having said $(B_2)X_4{}^{n-}$ framework structure in which cathodes the A cations are cations of H and Li, for use in solid state cells as described above, or for use as cell components in other types of electrochemical cells as described hereunder.

Thus the anode of the present invention may be used in cells employing neither of, or only one of, the cathode and electrolyte of the present invention. Likewise, the electrolyte may be used in cells employing neither of, or only one of, the cathode and anode of the present invention; and the cathode of the present invention may be used in cells employing neither of, or only one of, the anode and electrolyte of the present invention.

Thus the electrodes of this invention may be used in an electrochemical cell that employs either a solid electrolyte or a liquid electrolyte, or a combination thereof, such that the liquid electrolyte is situated between the solid electrolyte and the electrodes.

Any solid or liquid electrolyte that is to be used in conjunction with the electrodes of this invention will contain M cations that can be released by the host framework structures of the anodes during the cell reaction, and the M cations will be capable of incorporation into said host frameworks of the cathodes during the cell reaction.

The mobile M cations of the solid electrolyte or liquid electrolyte may again consist of H, Li, Cu or Ag ions, but are preferably Li ions.

The electrolyte is conveniently a room-temperature electrolyte, for example, a salt containing Li ions such as $LiClO_4$ or $LiBF_4$ dissolved in an organic solvent such as propylene carbonate, or it may be molten-salt electrolyte such as $LiAlCl_4$, which has a melting point of about 150° C., or a eutectic mixture of LiCl and KCl, which has a melting point of 352° C.

Whenever the framework structure is to be used as an anode coupled in a cell with a cathode, the B cations of the framework structure forming the electrochemical couple with the cathode, should as mentioned above be selected such that B is more electropositive than the active material of the cathode. Moreover, if B-type cations exist in the interstitial spaces of the framework structure as described above and also form the electrochemical couple with the cathode, then these B-type cations must also be more electropositive than the material of the cathode.

Similarly, B cations of the $(B_2)X_4^{n-}$ framework structure of a cathode of the present invention, or any B-type cations in its interstitial spaces, which form an electrochemical couple with the anode, should conversely be selected such that B is more electronegative than the material of the anode.

Anodes of this invention having the $(B_2)X_4^{n-}$ framework structure function in electrochemical cells in the following manner: During discharge of the cell M cations are released from the host framework structure of the anode into the electrolyte with a simultaneous oxidation of B-type cations in the anode framework structure. At cathodes of the formula $(B_2)X_4^{n-}$ as described above, during discharge of the cell M cations from the electrolyte enter the host framework structure of the cathode with a simultaneous reduction of a B-type cation of the cathode. The reverse processes can occur on charging of the cell.

The electrodes and electrolyte of this invention, therefore, will have application in both primary cells and, if the charge/discharge processes occurring at the electrodes are reversible, in secondary cells.

The invention also extends to a battery comprising a plurality of cells as described herein interconnected to one another.

The following compounds are possible examples of anodes, cathodes and solid electrolytes in accordance with the principles of this invention:

SOLID ELECTROLYTES (i) $Li_{2-x}(Y_{2-x}Zr_x)S_4$
(ii) $Li_{2-x}(Cr_{2-x}Zr_x)S_4$
(iii) $Li_{2x}Zn_{1-x}(Al_2)O_4$ Stabilization of the spinel structure in the sulphides may possibly require synthesis via low-temperature ion exchange of $Li^+$ ions for ions of a spinel stabilizer such as $Cu^+$, $Zn^{2+}$ or $Cd^{2+}$ ions.

| ANODES | Maximum and minimum values of x corresponding to fully charged and discharged states | | | | |
|---|---|---|---|---|---|
| | Charged | | | | Discharged |
| i $Li_xFe(Fe_2)O_4$ | 2 | > | x | > | 0 |
| ii $Li_x(Ti_2)O_4$ | 2 | > | x | > | 0 |
| iii $Li_x(Cr_2)S_4$ | 4 | > | x | > | 2 |

| CATHODES | Maximum and minimum values of x corresponding to fully charged and discharged states | | | | |
|---|---|---|---|---|---|
| | Charged | | | | Discharged |
| i $Li_x(Cr_2)S_4$ | 2 | < | x | < | 4 |
| ii $Li_{1+x}(Mn_2)O_4$ | 0 | < | x | < | 1,2 |

What is claimed is:

1. An electrochemical cell which comprises an anode and a cathode coupled together by a solid electrolyte, the anode and cathode being electronically conducting and the electrolyte being electronically insulating and each of said anode, cathode and electrolyte comprising a cubic-close-packed host framework structure having, as its basic structural unit, a unit of the formula $(B_2)X_4^{n-}$, where $(B_2)X_4^{n-}$ is the structural unit of a spinel, the X anions of said host framework structure being arranged in cubic-close-packed fashion to form a negatively charged anion array, said host framework structure accommodating, within its interconnected interstitial spaces, electrochemically active cations $M^+$ capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure, the B cations of the anode being more electropositive than those of the cathode.

2. A cell as claimed in claim 1, in which, in each of the framework structures of the anode, cathode and electrolyte, the B cations are those of one or more transition metals.

3. A cell as claimed in claim 1, in which, in the framework structure of the electrolyte, the M cations are selected from those of one or more of H, Li, Cu and Ag.

4. A cell as claimed in claim 1, in which in the framework structure of the anode, cathode and electrolyte, the M cations are selected from those of H and/or Li.

5. A cell as claimed in claim 4, in which said M cations are Li cations.

6. A cell as claimed in claim 1, in which either or both of the anode and cathode contain one or more electronically conductive additives dispersed therein to enhance their electronic conductivity.

7. A cell as claimed in claim 6, in which the additive(s) are selected from one or more of the group consisting in carbon and metal powders.

8. An anode for an electrochemical cell, which anode is electronically conducting and comprises a cubic-close-packed host framework structure having, as its basic structural unit, a unit of the formula $(B_2)X_4^{n-}$, where $(B_2)X_4{}^{n-}$ is the structural unit of a spinel, the X anions of said host framework structure being arranged in cubic-close-packed fashion to form a negatively charged anion array, said host framework accommodating, within its interconnected interstitial spaces, electrochemically active cations $M^+$ capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

9. An anode as claimed in claim 8, in which the B cations are those of one or more transition metals.

10. An anode as claimed in claim 8, in which the M cations are selected from those of H and/or Li.

11. An electrochemical cell which comprises an anode coupled to a cathode by an electrolyte, the anode being as claimed in claim 8.

12. A solid electrolyte for an electrochemical cell, which solid electrolyte is electronically insulating and comprises a cubic-close-packed host framework structure having as its basic structural unit a unit of the formula $(B_2)X_4{}^{n-}$, where $(B_2)X_4{}^{n-}$ is the structural unit of a spinel, the X anions of said host framework structure being arranged in cubic-close-packed fashion to form a negatively charged anion array, said host framework structure accommodating, within its interconnected interstitial spaces, electrochemically active cations $M^+$ capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

13. An electrolyte as claimed in claim 12, in which the B cations are selected from these of Al and/or Ga.

14. An electrolyte as claimed in claim 12, in which the B cations are those of one or more transition metals.

15. An electrolyte as claimed in claim 12, in which the M cations are selected from those of one or more of H, Li, Cu and Ag.

16. An electrolyte as claimed in claim 15, in which the M cations are selected from those of H and Li.

17. An electrochemical cell which comprises an anode coupled to a cathode by an electrolyte, the electrolyte being as claimed in claim 12.

18. A cathode for an electrochemical cell, which cathode is electronically conducting and comprises a cubic-close-packed host framework structure having, as its basic structural unit, a unit of the formula $(B_2)X_4{}^{n-}$, where $(B_2)X_4{}^{n-}$ is the structural unit of an $A(B_2)X_4$ spinel, the X anions of said host framework being arranged in cubic-close-packed fashion to form a negatively charged anion array, said host framework structure, when the cathode is at least partially charged, accommodating within its interconnected interstitial spaces, both the A cations of said $A(B_2)X_4$ spinel, and additional electrochemically active cations $M^+$ capable of diffusion through the framework structure, wherein:

A is a cation of H or Li;
B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

19. A cathode as claimed in claim 18, in which the B cations are those of one or more transition metals.

20. An electrochemical cell which comprises an anode coupled to a cathode by an electrolyte, the cathode being as claimed in claim 18.

21. An electrochemical cell which comprises an anode and a compatible cathode coupled together by a compatible electrolyte, the anode being electronically conducting and comprising a cubic-close-packed host framework structure having, as its basic structural unit, a unit of the formula $(B_2)X_4{}^{n-}$, where $(B_2)X_4{}^{n-}$ is the structural unit of a spinel, the X anions of said host framework structure being arranged in cubic-close-packed fashion to form a negatively charged anion array, said host framework accommodating, within its interconnected interstitial spaces, electrochemically active cations $M^+$ capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

22. An electrochemical cell which comprise an anode coupled to the compatible cathode by a compatible electrolyte, the electrolyte being a solid electrolyte which is electronically insulating and comprises a cubic-close-packed host framework structure having, as its basic structural unit, a unit of the formula $(B_2)X_4{}^{n-}$, where $(B_2)X_4{}^{n-}$ is the structural unit of a spinel, the X anions of said host framework structure being arranged in cubic-close-packed fashion to form a negatively charged anion array, said host framework structure accommodating, within its interconnected interstitial spaces, electrochemically active cations $M^+$ capable of diffusion through the framework structure, wherein:

B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

23. An electrochemical cell which comprises an anode coupled to a compatible cathode by a compatible electrolyte, the cathode being electronically conducting and comprising and comprises a cubic-close-packed host framework structure having, as its basic structural unit, a unit of the formula $(B_2)X_4{}^{n-}$, where $(B_2)X_4{}^{n-}$ is the structural unit of an $A(B_2)X_4$ spinel, the X anions of said host framework being arranged in cubic-close-packed fashion to form a negatively charged anion array, said host framework structure, when the cathode is at least partially charged, accommodating within its interconnected interstitial spaces, both the A cations of said $A(B_2)X_4$ spinel, and additional electrochemically active cations $M^+$ capable of diffusion through the framework structure, wherein:

A is a cation of H or Li;
B is a metal cation;
X is an anion selected from the group VIa or group VIIa elements;
M is a cation selected from the group Ia or group Ib elements; and
n— refers to the overall charge of the structural unit $(B_2)X_4$ of the host framework structure.

* * * * *